US012238491B2

(12) United States Patent
Ruan

(10) Patent No.: US 12,238,491 B2
(45) Date of Patent: Feb. 25, 2025

(54) CONTROL METHOD FOR A BLOCKED RECEIVER AND DEVICE, AND ELECTRONIC DEVICE

(71) Applicant: VIVO MOBILE COMMUNICATION CO., LTD., Dongguan (CN)

(72) Inventor: Qingbo Ruan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 252 days.

(21) Appl. No.: 17/717,029

(22) Filed: Apr. 8, 2022

(65) Prior Publication Data

US 2022/0232320 A1 Jul. 21, 2022

Related U.S. Application Data

(63) Continuation of application No. PCT/CN2020/121891, filed on Oct. 19, 2020.

(30) Foreign Application Priority Data

Oct. 23, 2019 (CN) ........................ 201911012461.X

(51) Int. Cl.
*H04R 3/02* (2006.01)
*H04R 29/00* (2006.01)

(52) U.S. Cl.
CPC ............... *H04R 3/02* (2013.01); *H04R 29/00* (2013.01); *H04R 2430/01* (2013.01)

(58) Field of Classification Search
CPC ....... H04R 3/02; H04R 29/00; H04R 2430/01
USPC ............................................................ 381/58
See application file for complete search history.

(56) References Cited

U.S. PATENT DOCUMENTS

2015/0236743 A1 8/2015 Kennedy

FOREIGN PATENT DOCUMENTS

| | | | |
|---|---|---|---|
| CN | 102195566 | A | 9/2011 |
| CN | 103501375 | A | 1/2014 |
| CN | 104104346 | A | 10/2014 |
| CN | 105103568 | A | 11/2015 |
| CN | 106412168 | A | 2/2017 |
| CN | 106792423 | A | 5/2017 |
| CN | 106851515 | A | 6/2017 |
| CN | 106878880 | A | 6/2017 |
| CN | 108307284 | A | 7/2018 |

(Continued)

OTHER PUBLICATIONS

ProQuest Translation of CN 109996161 A with google translated figures (generated Feb. 7, 2024) (Year: 2019).*

(Continued)

*Primary Examiner* — Vivian C Chin
*Assistant Examiner* — Douglas J Suthers
(74) *Attorney, Agent, or Firm* — IPX PLLC

(57) ABSTRACT

A receiver control method and device, and an electronic device are provided. The electronic device includes at least one receiver, wherein the at least one receiver is electrically connected to a baseband circuit, and a feedback circuit is arranged between at least one receiver and the baseband circuit. The receiver control method includes: detecting the at least one receiver; and in a case of detecting that a first receiver of the at least one receiver is blocked, adjusting an electrical signal gain of the feedback circuit corresponding to the first receiver to reduce an electrical signal input to the first receiver.

6 Claims, 5 Drawing Sheets

(56) References Cited

FOREIGN PATENT DOCUMENTS

| | | | |
|---|---|---|---|
| CN | 109040912 | A | 12/2018 |
| CN | 109996161 | A | 7/2019 |
| CN | 110830861 | A | 2/2020 |

OTHER PUBLICATIONS

International Search Report issued in corresponding International Application No. PCT/CN2020/121891, mailed Jan. 20, 2021, 4 pages.
First Office Action issued in related Chinese Application No. 201911012461.X, mailed Aug. 4, 2020, 10 pages.
Second Office Action issued in related Chinese Application No. 201911012461.X, mailed May 6, 2021, 9 pages.

* cited by examiner

CONTROL METHOD FOR A BLOCKED RECEIVER AND DEVICE, AND ELECTRONIC DEVICE

CROSS-REFERENCE TO RELATED APPLICATION

This application is a bypass continuation of PCT Application No. PCT/CN2020/121891 filed Oct. 19, 2020, which claims priority to Chinese Patent Application No. 201911012461.X filed in China on Oct. 23, 2019, both of which are incorporated herein by reference in their entireties.

TECHNICAL FIELD

Embodiments of the present disclosure relate to the technical field of communication, and in particular, to a receiver control method and device, and an electronic device.

BACKGROUND

With the continuous evolution of functions and appearances of electronic devices, people have higher and higher requirements on the design of the electronic devices, and the design scheme of a receiver structure in the electronic devices is also being updated. Usually, the sound output position of the receiver structure of the electronic device is generally located at the top near the center, but due to the influence of the stacking design of the electronic device, the receiver in the receiver structure cannot be placed at the sound output position. Therefore, there is a receiver structure: two or more than two receivers are arranged in the electronic device to emit sound through the micro-slit located at the sound output position, so that the sound output loudness of the receiver structure of the electronic device is enhanced.

However, in practical application, the sound produced by the receiver structure is prone to noise during the call of the electronic device adopting this receiver design scheme, resulting in a great negative influence on the sensual experience of users.

SUMMARY

Embodiments of the present disclosure provide a receiver control method and device, and an electronic device, so as to solve the problem that the sound produced by the receiver structure is prone to noise during the call of the electronic device.

In order to solve the above technical problem, according to a first aspect, embodiments of the present disclosure provides a receiver control method, applied to an electronic device, wherein the electronic device includes at least one receiver, the at least one receiver is electrically connected to a baseband circuit, and a feedback circuit is arranged between the at least one receiver and the baseband circuit.

The receiver control method includes:

detecting the at least one receiver, and in a case of detecting that a first receiver of the at least one receiver is blocked, adjusting the electrical signal gain of the feedback circuit corresponding to the first receiver so as to reduce an electrical signal input to the first receiver.

According to a second aspect, embodiments of the present disclosure further provides a receiver control device, applied to an electronic device, wherein the electronic device includes at least one receiver, the at least one receiver is electrically connected to a baseband circuit, and a feedback circuit is arranged between the at least one receiver and the baseband circuit.

The receiver control device includes a detection assembly and an adjusting assembly, wherein the detection assembly is connected to the adjusting assembly, and the adjusting assembly is electrically connected to feedback circuit; the detection assembly is configured to detect the at least one receiver and send the detection result to the adjusting assembly; and the adjusting assembly is configured to receive the detection result sent by the detection assembly, and in a case that the detection result is that a first receiver of the at least one receiver is blocked, adjust the electrical signal gain of the feedback circuit corresponding to the first receiver so as to reduce an electrical signal input to the first receiver.

According to a third aspect, embodiments of the present disclosure further provide an electronic device. The electronic device includes: at least one receiver and a receiver control device, wherein the at least one receiver is electrically connected to a baseband circuit, and a feedback circuit is arranged between the at least one receiver and the baseband circuit, and the receiver control device adopts the receiver control device according to the second aspect.

According to a fourth aspect, embodiments of the present disclosure further provide an electronic device, including a processor, a memory, and a computer program stored in the memory and capable of running on the processor, wherein when the computer program is executed by the processor, the receiver control method according to the first aspect is implemented.

According to a fifth aspect, embodiments of the present disclosure further provides a computer readable storage medium, wherein the computer readable storage medium stores a computer program, and when the computer program is executed by a processor, the receiver control method according to the first aspect is implemented.

In the embodiments of the present disclosure, the situation that a sound output hole of the receiver is blocked can be detected. In a case of detecting that the first receiver of the at least one receiver is blocked, self-adaptive adjustment may be realized in combination with the feedback circuit corresponding to the first receiver, the electrical signal gain of the feedback circuit corresponding to the first receiver is adjusted, and the electrical signal input to the first receiver is reduced, so that noise generated by the hole blockage of the first receiver is suppressed, the call experience of a user is improved, noise caused by unsmooth airflow in a cavity of the receiver due to the hole blockage of the receiver is obviously reduced, and the effect for a user who needs to move the electronic device frequently during the call is improved significantly.

BRIEF DESCRIPTION OF DRAWINGS

It may be better understood from the following descriptions of specific implementations of the present disclosure with reference to the accompanying drawings that same or similar reference numerals represent same or similar features in the present disclosure.

DETAILED DESCRIPTION

The technical solutions in embodiments of the present disclosure are described below clearly and completely with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Before the receiver control method and device according to the embodiments of the present disclosure are proposed, the inventor of the present disclosure has performed in-depth study on the habits of users using electronic devices such as a mobile phone, a tablet computer, a notebook computer, a palm computer, a vehicle-mounted terminal, a wearable device and a pedometer for call. It has been found from the study that most of the time, a user is not stationary when holding the electronic device for call, and the hand or head may move during the call, so that the user's auricle will move relative to the micro-slit in the receive structure of the electronic device, the blockage situation of the user's auricle on the micro-slit is changed, and the blockage situation of the sound output holes of the receiver at different positions of the micro-slit will change accordingly, thereby leading to unsmooth air flow in the cavity of the receiver, easily generating noise and influencing the call process.

Therefore, the inventor of the present disclosure has further performed in-depth study on the working processes when the receiver is not blocked and when the receiver is blocked. On this basis, the receiver control method and device according to the embodiments of the present disclosure are provided, so as to reduce the noise caused by improper use of the electronic device, for example the sound output hole of the receiver is blocked.

The receiver control method and device provided by the embodiments of the present disclosure are applied to an electronic device including at least one receiver, wherein the at least one receiver is electrically connected to a baseband circuit, and a feedback circuit is arranged between the at least one receiver and the baseband circuit. When the number of the at least one receiver is two or more than two, each receiver is electrically connected to the baseband circuit respectively, and a feedback circuit is arranged between each receiver and the baseband circuit respectively.

Figure 1:
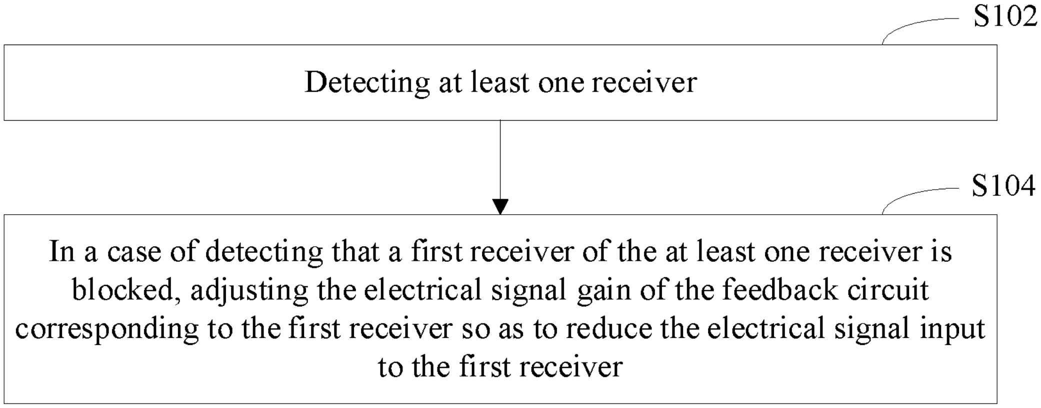
FIG. 1 is a flow block diagram of an embodiment of a receiver control method according to the present disclosure.

FIG. 1 is a flow block diagram of an embodiment of a receiver control method according to the present disclosure. As shown in FIG. 1, the receiver control method includes:

S102: detecting at least one receiver; and

S104: in a case of detecting that a first receiver of the at least one receiver is blocked, adjusting the electrical signal gain of the feedback circuit corresponding to the first receiver so as to reduce an electrical signal input to the first receiver.

The receiver control method provided by the embodiment of the present disclosure may be applied to the electronic device including at least one receiver. The electronic device may include a mobile phone, a tablet computer, a notebook computer, a palmtop computer, a vehicle-mounted terminal, a wearable device, a pedometer, or the like.

In the embodiments of the present disclosure, the situation that a sound output hole of the receiver is blocked can be detected. In a case of detecting that the first receiver of the at least one receiver is blocked, self-adaptive adjustment may be realized in combination with the feedback circuit corresponding to the first receiver, the electrical signal gain of the feedback circuit corresponding to the first receiver is adjusted, and the electrical signal input to the first receiver is reduced, so that noise generated by the hole blockage of the first receiver is suppressed, the call experience of a user is improved, noise caused by unsmooth airflow in a cavity of the receiver due to the hole blockage of the receiver is obviously reduced, and the effect for a user who needs to move the electronic device frequently during the call is improved significantly.

In the step S102 of some embodiments of the present disclosure, the method for detecting the at least one receiver may specifically include: detecting a target parameter of the at least one receiver electrically connected to the baseband circuit to obtain a detection value of the target parameter, wherein the target parameter includes an impedance of the receiver and/or a resonance frequency of the receiver.

In the step S104 of some embodiments of the present disclosure, the method for specifically determining whether the first receiver of the at least one receiver is blocked may include: in a case that the detection value of the target parameter of the first receiver of the at least one receiver meets a preset condition, determining that the first receiver is blocked, that is, hole block occurs in the first receiver. That the receiver is blocked may be that the sound output hole of the receiver is blocked. At this time, the electrical signal gain of the feedback circuit corresponding to the first receiver may be adjusted so as to reduce the electrical signal input to the first receiver.

In some embodiments of the present disclosure, after the step S104, the receiver control method may further include:

in a case of detecting that the first receiver is not blocked, adjusting the electrical signal gain of the feedback circuit corresponding to the first receiver so as to increase the electrical signal input to the first receiver to a preset value, wherein the preset value refers to a gain value when the gain of the electrical signal of the feedback circuit corresponding to the first receiver is at an initial level.

Therefore, the embodiment of the present disclosure may detect a receiving signal of the receiver and adjust the electrical signal gain of the feedback circuit of the receiver meeting the determination condition of the hole block of the receiver, so as to adjust the magnitude of the electrical signal input to the receiver, for example, to reduce the voltage of the electrical signal, thereby suppressing noise generated by hole blockage of the receiver.

Figure 2:
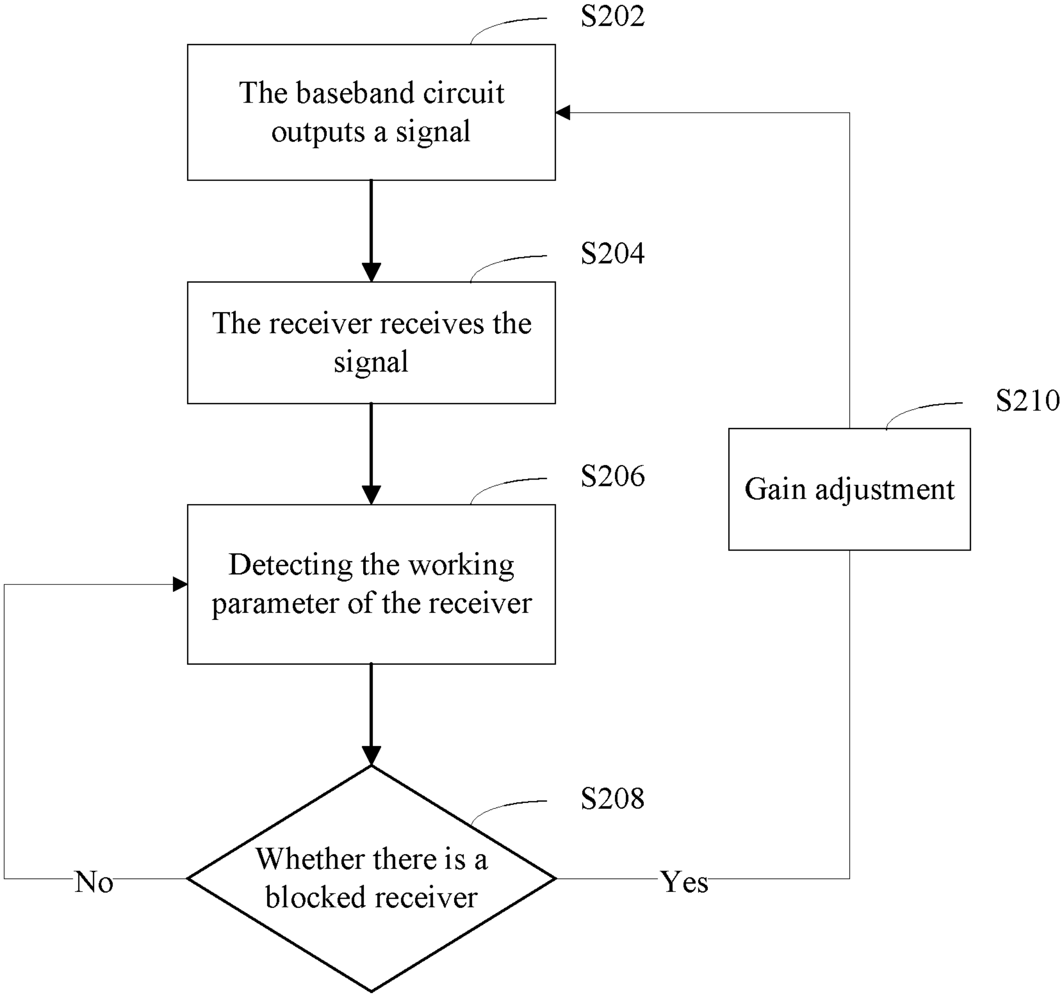
FIG. 2 is a flow block diagram of another embodiment of a receiver control method according to the present disclosure.

FIG. 2 is a flow block diagram of another embodiment of a receiver control method according to the present disclosure. As shown in FIG. 2, the processing process of the receiver control method is as follows:

S202: in the process that the electronic device outputs a sound through at least one receiver, the baseband circuit outputs a signal, such as an audio electrical signal;

S204: the receiver receives the audio electrical signal;

in application, the audio electrical signal output by the baseband circuit needs to be processed by an audio codec, a power amplifier and the like before entering the receiver, and the receiver converts the received audio electrical signal into a sound signal to make a sound through a micro-slit in the receiver structure;

S206: in the working process of the receiver, a working parameter of the receiver is detected to mainly obtain a detection value of a target parameter;

S208: determining whether there is a receiver of the at least one receiver is blocked on the basis of the detection value of the target parameter, that is, whether there is a receiver suffering from hole blockage;

in a case that the detection value of the target parameter of the first receiver of the at least one receiver meets the preset condition, considering that the sound output hole of the first receiver is blocked, that is, there is a blocked receiver, and performing S210;

in a case that the detection value of the target parameter of the at least one receiver does not meet the preset condition, it indicates that the sound output holes of all the receivers are not blocked, that is, there is no blocked receiver, returning to S206 and continuously detecting the working parameter of the receiver;

S210: starting the gain adjustment on the electrical signal of the feedback circuit corresponding to the first receiver, that is, reducing the gain of the electrical signal of the feedback circuit so as to reduce the electrical signal input to the first receiver, thereby reducing the sound output volume of the first receiver and reducing noise; or adjusting the gain of the electrical signal of the feedback circuit to zero to reduce the voltage of the electrical signal input to the first receiver to zero, so that the first receiver stops work and the aim of eliminating noise can be achieved; and then, when the working parameter of the first receiver is restored to normal, that is, when the detection value of the target parameter of the first receiver does not meet the preset condition any more, the gain of the electrical signal of the feedback circuit corresponding to the first receiver may be increased to the initial level, and normal sound is made.

In some embodiments of the present disclosure, the target parameter may be an impedance of the receiver, and before the step of detecting the at least one receiver, the receiver control method may further include:

detecting a maximum impedance R' in a case that each receiver is not blocked, detecting a maximum impedance value R" in a case that each receiver is blocked, and setting the preset condition as: the detected maximum impedance value of the receiver is less than a first predetermined threshold, wherein the specific value of the R' may be detected before the receiver leaves the factory.

Specifically, in a case that the target parameter is the impedance of the receiver, the corresponding preset condition may be specifically: the detected maximum impedance value of the receiver is less than the first predetermined threshold.

In some embodiments, the first predetermined threshold may be the maximum impedance value R'. The reason for such setting is that the study shows that an impedance peak value R" after hole blockage of the receiver is less than an impedance peak value R' when the receiver is not blocked, so when it is detected that the impedance peak value of the receiver is less than the impedance peak value R' which should be in normal operation, it may be determined that the sound output hole of the receiver has been blocked.

In some other embodiments, the first predetermined threshold may be (R'+R")/2. The advantage of such setting is that the first predetermined threshold, that is, the impedance threshold, is set as (R'+R")/2, which is between the peak value R' when the receiver is not blocked and the peak value R" after hole blockage, and the requirement of determining hole blockage of the receiver is increased, so that the circuit will not be adjusted frequently due to the reduced impedance value caused by other factors in practical application.

In some other embodiments of the present disclosure, the target parameter may also be a resonance frequency of the receiver; and before the step of detecting the at least one receiver, the receiver control method may further include:

detecting a resonance frequency value $F_0$' corresponding to the maximum impedance value R' in a case that each receiver is not blocked, detecting a resonance frequency value $F_0$" corresponding to the maximum impedance value R" in a case that each receiver is blocked, and setting the preset condition as: the detected resonance frequency value corresponding to the maximum impedance value of the receiver is less than a second predetermined threshold, wherein the specific value of the $F_0$' may be detected before the receiver leaves the factory.

Specifically, in a case that the target parameter is the resonance frequency of the receiver, the corresponding preset condition may be specifically: the detected resonance frequency value corresponding to the maximum impedance value of the receiver is less than the second predetermined threshold.

In some embodiments, the second predetermined threshold may be the resonance frequency value $F_0$' corresponding to the maximum impedance value R'. The reason for such setting is that the study shows that the resonance frequency value $F_0$" corresponding to the maximum impedance value R" after hole blockage of the receiver is less than the resonance frequency value $F_0$' corresponding to the maximum impedance value R' when the receiver is not blocked, so when it is detected that the resonance frequency value corresponding to the maximum impedance value of the receiver is less than the resonance frequency value $F_0$" which should be in normal operation, it may be determined that the sound output hole of the receiver has been blocked.

In some other embodiments, the second predetermined threshold may be ($F_0$'+$F_0$")/2. The advantage of such setting is that the second predetermined threshold, that is, the impedance threshold, is set as ($F_0$'+$F_0$")/2, which is between $F_0$' when the receiver is not blocked and $F_0$" after hole blockage, and the requirement of determining hole blockage of the receiver is increased, so that the circuit will not be adjusted frequently due to the reduced resonance frequency value caused by other factors in practical application.

In other implementation manners of the present disclosure, the target parameter may also be an impedance and a resonance frequency of the receiver. Before the step of detecting the at least one receiver, the receiver control method further includes:

making a first impedance curve f' in a case that each receiver is not blocked, determining a maximum impedance value R1' and a second maximum impedance value R2' on the first impedance curve. After the detection value of the target parameter is obtained, the receiver control method further includes: based on the detection value of the target parameter, making a second impedance curve f" of the receiver, and determining a maximum impedance value R1" and a second impedance value R2" on the second impedance curve, wherein the preset condition may be: on the f' and the f", a resonance peak of R1" corresponds to a resonance peak of R1', and a resonance peak of R2" does not correspond to a resonance peak of R2'.

Figure 3:
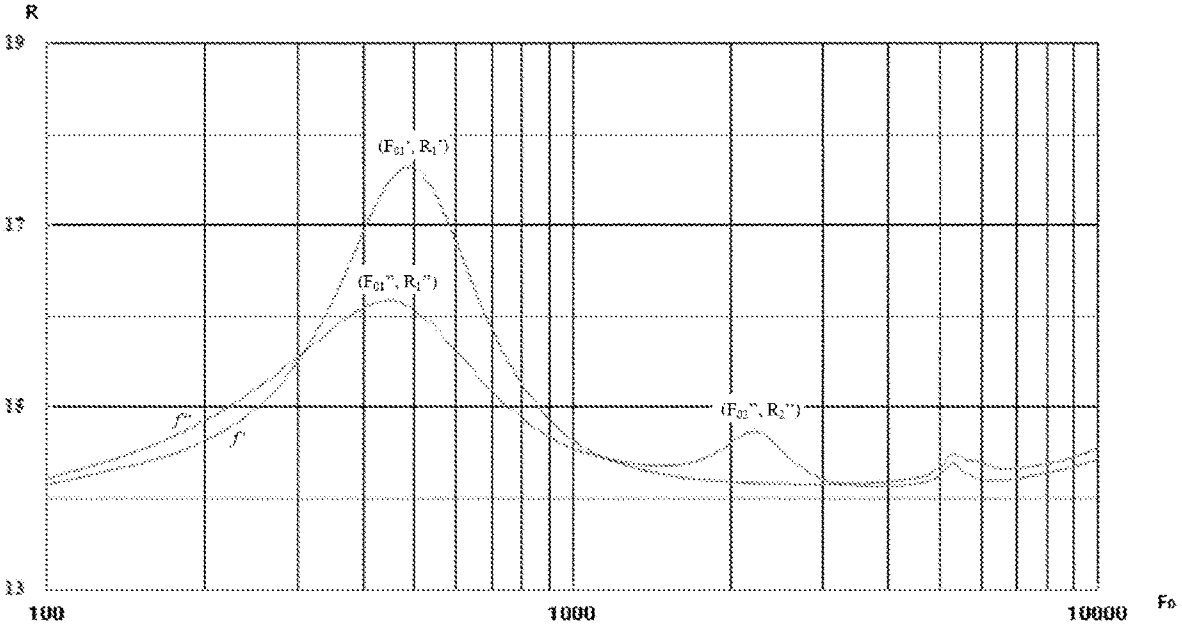
FIG. 3 is a schematic diagram of an example of an impedance curve effect of a receiver according to the present disclosure.

Specifically, the target parameters in the embodiments of the present disclosure are the impedance and the resonance frequency of the receiver. The impedance curve of the receiver may be made according to the evolution of the impedance and the resonance frequency. FIG. 3 shows an effect schematic diagram of an impedance curve f' when the receiver is not blocked and an impedance curve f" after hole blockage of the receiver according to the embodiments of the present disclosure, wherein the x-coordinate is the resonance frequency $F_0$ of the receiver in hertz (Hz), and the y-coordinate is the impedance of the receiver in ohm (Ω). In FIG. 3, it also schematically marks the coordinates ($F_{01}$', $R_1$') of the maximum peak value point on the impedance curve f' when the receiver is not blocked, and the coordinates ($F_{01}$", $R_1$") of the maximum peak value point and the coordinates ($F_{02}$", $R_2$") of the second maximum peak value point on the impedance curve f" after hole blockage.

It can be seen from FIG. 3 that through comparison after hole blockage of the receiver and when the receiver is not blocked:

firstly, the maximum impedance value $R_1$" of the impedance curve f" after hole blockage is reduced compared with the maximum impedance peak value $R_1$' when the receiver is not blocked;

secondly, the maximum resonance peak of the impedance curve f" after hole block corresponds to the maximum resonance peak of the impedance curve f' when the receiver is not blocked, and the maximum resonance peak after hole blockage shifts to the left and the resonance frequency is reduced; and thirdly, a resonance peak, that is, a resonance peak corresponding to the coordinates ($F_{02}$", $R_2$"), of a second peak value occurs near a specific frequency, about between 2 k and 3 kHz in FIG. 3, it is found through comparison that the second maximum resonance peak of f" after hole blockage does not correspond to the second maximum resonance peak of f' when the receiver is not blocked, specifically as follows: a resonance peak corresponding to the second maximum resonance peak of f" is not present on f', but the curve is a smooth transition between 2 k and 3 k Hz on f'.

Based on this, the embodiments of the present disclosure may set the preset condition as: on f' and f", the resonance peak of $R_1$' corresponds to the resonance peak of $R_2$', and the resonance peak of $R_2$' does not correspond to the resonance peak of $R_2$". In a case that the working process of the receiver meets the preset condition, it may be considered that hole blockage occurs in the receiver.

The above describes the detection values of the target parameters adopted in various implementation manners of the embodiments of the present disclosure and the corresponding preset conditions. Whether the receiver is blocked is detected in real time. If the preset condition is met, the gain adjustment on the receiver is started in order to avoid noise caused by hole blockage of the receiver, specifically as follows: the gain is increased or reduced through the feedback circuit of the receiver, so that the electrical signal input to the receiver is reduced, and the noise caused by hole blockage can be reduced to a certain degree.

In other embodiments, the electrical signal input to the receiver may also be adjusted to zero, so that the receiver stops working; and after the hole blockage situation of the receiver is eliminated, the gain is restored to the initial level.

Corresponding to the receiver control method, the embodiments of the present disclosure further provide a receiver control device.

Figure 4:
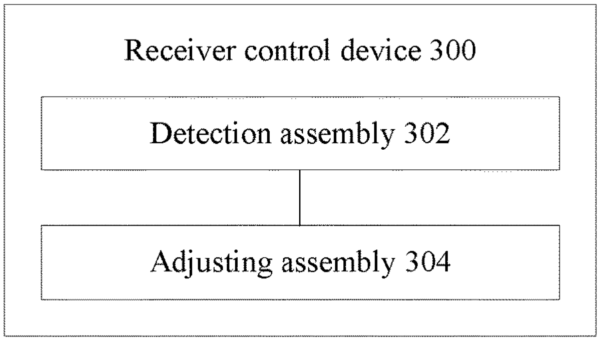
FIG. 4 is a structural schematic diagram of an embodiment of a receiver control device according to the present disclosure.

FIG. 4 shows a structural schematic diagram of an embodiment of a receiver control device according to the present disclosure. As shown in FIG. 4, the receiver control device 300 includes a detection assembly 302 and an adjusting assembly 304, wherein the detection assembly 302 is electrically connected to the adjusting assembly 304. In a case that the receiver control device 300 is applied to the electronic device including at least one receiver, the adjusting assembly 304 is electrically connected to a feedback circuit.

Specifically, the detection assembly 302 is configured to detect at least one receiver and send the detection result to the adjusting assembly 304; and the adjusting assembly 304 is configured to receive the detection result sent by the detection assembly, and in a case that the detection is that a first receiver of the at least one receiver is blocked, adjust the electrical signal gain of the feedback circuit corresponding to the first receiver so as to reduce the electrical signal input to the first receiver.

In the embodiments of the present disclosure, the situation that a sound output hole of the receiver is blocked can be detected. In a case of detecting that the first receiver of the at least one receiver is blocked, self-adaptive adjustment may be realized in combination with the feedback circuit corresponding to the first receiver, the electrical signal gain of the feedback circuit corresponding to the first receiver is adjusted, and the electrical signal input to the first receiver is reduced, so that noise generated by the hole blockage of the first receiver is suppressed, the call experience of a user is improved, noise caused by unsmooth airflow in a cavity of the receiver due to the hole blockage of the receiver is obviously reduced, and the effect for a user who needs to move the electronic device frequently during the call is improved significantly.

In some embodiments of the present disclosure, the detection assembly 302 may include a parameter detection submodule and a determination submodule, wherein the parameter detection submodule is configured to detect a target parameter of at least one receiver and obtain a detection value of the target parameter; the target parameter includes an impedance of the receiver and/or a resonance frequency of the receiver; and the determination submodule is configured to, in a case that the detection value of the target parameter of the first receiver of the at least one receiver meets a preset condition, determine that the receiver is blocked, and send the determination result as a detection result to the adjusting assembly 304.

In some embodiments of the present disclosure, the target parameter is the impedance of the receiver, and the preset condition is that the detected maximum impedance value of the receiver is less than a first predetermined threshold. At this time, the first predetermined threshold is (R'+R")/2, or the first predetermined threshold is R', wherein R' is a maximum impedance value in a case that the receiver is not blocked, and R" is a maximum impedance value in a case that the receiver is blocked.

In some other embodiments of the present disclosure, the target parameter is the resonance frequency of the receiver, and the preset condition is that the detected frequency resonance value corresponding to the maximum impedance value of the receiver is less than a second predetermined threshold. At this time, the second predetermined threshold is $(F_0'+F_0'')/2$, or the second predetermined threshold is $F_0'$, wherein $F_0'$ is a resonance frequency value corresponding to the maximum impedance value R' in a case that the receiver is not blocked, and $F_0''$ is a resonance frequency value corresponding to the maximum impedance value R" in a case that the receiver is blocked.

In some other embodiments of the present disclosure, the target parameter includes the impedance and the resonance frequency of the receiver. The receiver control device 300 further includes:

a curve making module, configured to obtain a first impedance curve f' according to the impedance and the resonance frequency of the receiver in a case that the receiver is not blocked, and determine a maximum impedance value R1' and a second maximum impedance value R2' on the first impedance curve f'; and after the detection value of the target parameter is obtained, obtain a second impedance curve f" of the receiver based on the detection value of the target parameter, and determine a maximum impedance value R1" and second maximum impedance value R2" on the second impedance curve f".

At this time, the preset condition is that on the first impedance curve f' and the second impedance curve f", a resonance peak of R1" corresponds to a resonance peak of R1', and a resonance peak of R2" does not correspond to a resonance peak of R2'.

In some embodiments of the present disclosure, the adjusting assembly 304 is further configured to: after the electrical signal gain of the feedback circuit corresponding to the first receiver is adjusted so as to reduce the electrical signal input to the first receiver, in a case of detecting that the first receiver is not blocked, adjust the electrical signal gain of the feedback circuit corresponding to the first receiver so as to increase the electrical signal input to the first receiver to a preset value, In the embodiments of the present disclosure, the adjusting assembly 304 is specifically configured to reduce the gain of the feedback circuit and/or adjust the gain of the feedback circuit to zero.

In some embodiments of the present disclosure, the number of the at least one receiver of the electronic device is two or more than two, wherein each receiver is electrically connected to a baseband circuit respectively, and a feedback circuit is arranged between each receiver and the baseband circuit respectively.

Figure 5:
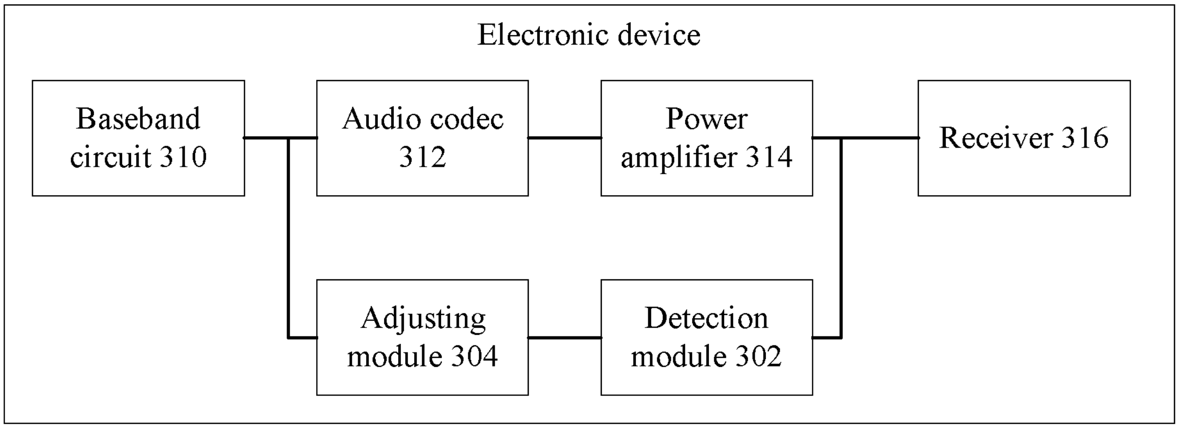
FIG. 5 is a structural schematic diagram of an embodiment of an electronic device according to the present disclosure.
Figure 6:
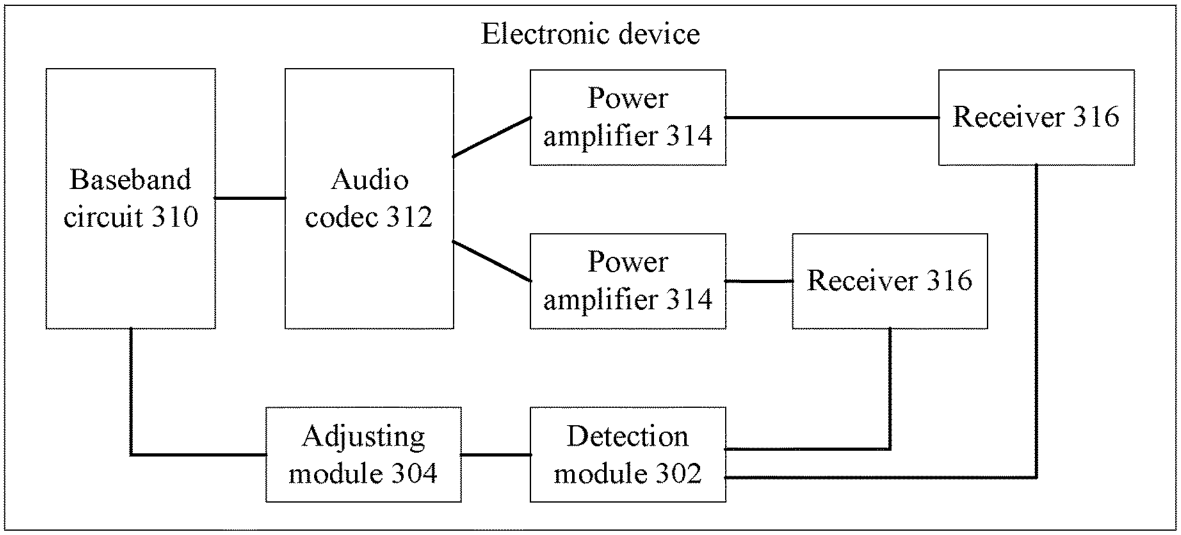
FIG. 6 is a structural schematic diagram of another embodiment of an electronic device according to the present disclosure.

FIG. 5 and FIG. 6 show two implementation manners of the embodiments of the present disclosure. FIG. 5 is that the electronic device includes one receiver 316, and FIG. 6 is that the electronic device includes two receivers 316. For one or a plurality of receivers, a corresponding power amplifier (PA) may be provided to serve as a feedback circuit, thereby realizing the gain adjusting process.

Specifically, in a case that the number of the receiver in the electronic device is one, referring to FIG. 5, the receiver 316 is electrically connected to the power amplifier 314, and the power amplifier 314 is electrically connected to the baseband circuit 310. As an embodiment, an audio codec 312 is connected between the power amplifier 314 and the baseband circuit 310.

In addition, in a case that the number of the receivers in the electronic device is more than one, such as two, three or more, referring to FIG. 6, each receiver 316 is electrically connected to one power amplifier 314, and each power amplifier 314 is electrically connected to the baseband circuit 310. As an embodiment, each power amplifier 314 is connected to the baseband circuit 310 through an audio codec 312.

The receiver control device according to the embodiments of the present disclosure can implement various process implemented by the electronic device in the method embodiments shown in FIG. 1 to FIG. 3. The electronic device may include a receiver control device, which may suppress noise caused by hole blockage of the receiver during call, which will not be elaborated herein.

Figure 7:
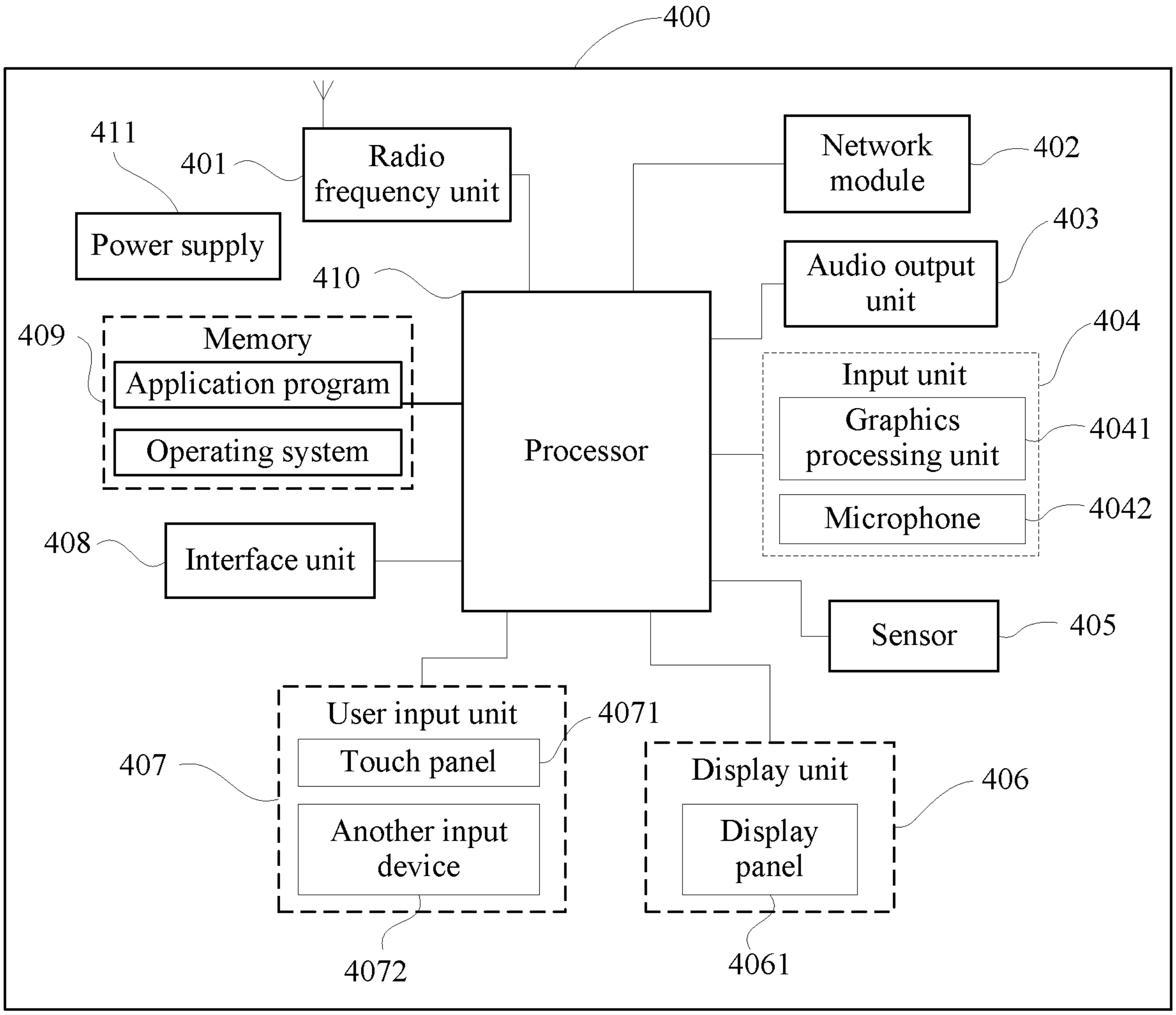
FIG. 7 is a schematic diagram of a hardware structure of an electronic device for implementing various embodiments of the present disclosure.

FIG. 7 is a schematic diagram of a hardware structure of an electronic device for implementing various embodiments of the present disclosure. As shown in FIG. 7, the electronic device 400 includes but is not limited to: a radio frequency unit 401, a network module 402, an audio output unit 403, an input unit 404, a sensor 405, a display unit 406, a user input unit 407, an interface unit 408, a memory 409, a processor 410, a power supply 411 and the like. A person skilled in the art may understand that a structure of the electronic device shown in FIG. 7 constitutes no limitation on the electronic device, and the electronic device may include more or fewer components than those shown in the figure, or have a combination of some components, or have a different component arrangement. In this embodiment of the present disclosure, the electronic device includes, but is not limited to, a mobile phone, a tablet computer, a notebook computer, a palmtop computer, a vehicle-mounted terminal, a wearable device, a pedometer, or the like.

The audio output unit 403 includes a loudspeaker, a buzzer, a telephone receiver and the like. The number of the receivers may be at least one, the at least one receiver is electrically connected to the baseband circuit, and a feedback circuit is arranged between the at least one receiver and the baseband circuit.

The processor 410 is configured to detect the at least one receiver, and in a case of detecting that a first receiver of the at least one receiver is blocked, adjust the electrical signal gain of the feedback circuit corresponding to the first receiver so as to reduce the electrical signal input to the first receiver.

In the embodiments of the present disclosure, the situation that a sound output hole of the receiver is blocked can be detected. In a case of detecting that the first receiver of the at least one receiver is blocked, self-adaptive adjustment may be realized in combination with the feedback circuit corresponding to the first receiver, the electrical signal gain of the feedback circuit corresponding to the first receiver is adjusted, and the electrical signal input to the first receiver is reduced, so that noise generated by the hole blockage of the first receiver is suppressed, the call experience of a user is improved, noise caused by unsmooth airflow in a cavity of the receiver due to the hole blockage of the receiver is obviously reduced, and the effect for a user who needs to move the electronic device frequently during the call is improved significantly.

It should be understood that, in this embodiment of the present disclosure, the radio frequency unit 401 may be configured to transmit and receive information, or transmit or receive signals during communication. Specifically, after receiving downlink data from a base station, the radio frequency unit sends the downlink data to the processor 410 for processing. In addition, the radio frequency unit sends the uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may further communicate with a network and other devices by using a wireless communication system.

The electronic device provides wireless broadband Internet access for the user by using the network module 402, for example, helping the user to send and receive an e-mail, brows a web page, and access streaming media.

The audio output unit 403 may convert audio data received through the radio frequency unit 401 or the network module 402 or stored in the memory 409 into an audio signal and output the audio signal as a sound. Moreover, the audio output unit 403 may further provide an audio output (for example, call signal receiving sound and message receiving sound) related to a specific function performed by the electronic device 400.

The input unit 404 is configured to receive audio or video signals. The input unit 404 may include a Graphics Processing Unit (GPU) 4041 and a microphone 4042. The graphics processing unit 4041 is configured to process image data of a static picture or a video obtained by an image capture device (for example, a camera) in a video capture mode or an image capture mode. A processed image frame may be displayed on the display unit 406. The image frame processed by the graphics processing unit 4041 may be stored in the memory 409 (or another storage medium) or transmitted via the radio frequency unit 401 or the network module 402. The microphone 4042 may receive a sound and may process such a sound into audio data. The processed audio data may be converted, in a phone calling mode, into a format that may be transmitted to a mobile communication base station by using the radio frequency unit 401 for output.

The electronic device 400 further includes at least one sensor 405 such as a light sensor, a motion sensor, and another sensor. Specifically, the light sensor includes an ambient light sensor and a proximity sensor. The ambient light sensor can adjust brightness of a display panel 4061 according to ambient light brightness. The proximity sensor can switch off the display panel 4061 and/or backlight when the electronic device 400 moves close to an ear. As a motion sensor, an accelerometer sensor can detect magnitude of acceleration in various directions (usually three axes), can detect magnitude and the direction of gravity when stationary, can be configured to identify electronic device postures (such as switching between a landscape mode and a portrait mode, related games, and magnetometer posture calibration), can perform functions related to vibration identification (such as a pedometer and a knock), and the like. The sensor 405 may further include a fingerprint sensor, a pressure sensor, an iris sensor, a molecular sensor, a gyroscope, a barometer, a hygrometer, a thermometer, an infrared sensor, or the like. Details are not described herein.

The display unit 406 is configured to display information input by a user or information provided to a user. The display unit 406 may include a display panel 4061, and the display panel 4061 may be configured in a form of liquid crystal display (LCD), organic light-emitting diode (OLED), or the like.

The user input unit 407 may be configured to: receive entered digital or character information, and generate key signal input related to a user setting and function control of the electronic device. Specifically, the user input unit 407 includes a touch panel 4071 and other input devices 4072. The touch panel 4071 is also referred to as a touchscreen, and may collect a touch operation performed by a user on or near the touch panel 4071 (such as an operation performed by a user on the touch panel 4071 or near the touch panel 4071 by using any proper object or accessory, such as a finger or a stylus). The touch panel 4071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 410, and receives and executes a command from the processor 410. In addition, the touch panel 4071 may be of a resistive type, a capacitive type, an infrared type, a surface acoustic wave type, or the like. In addition to the touch panel 4071, the user input unit 407 may further include other input devices 4072. Specifically, the another input devices 4072 may include but are not limited to: a physical keyboard, a function key (such as a volume control key, a switch key), a trackball, a mouse, and a joystick. Details are not described herein again.

Further, the touch panel 4071 may cover the display panel 4061. After detecting the touch operation on or near the touch panel 4071, the touch panel 4061 transmits the touch operation to the processor 410 to determine a type of a touch event, and then the processor 410 provides corresponding visual output on the display panel 4061 based on the type of the touch event. Although the touch panel 4071 and the display panel 4061 are used as two independent parts to implement input and output functions of the electronic device, in some embodiments, the touch panel 4071 and the display panel 4061 may be integrated to implement the input and output functions of the electronic device. This is not specifically limited herein.

The interface unit 408 is an interface for connecting an external apparatus with the electronic device 400. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 408 may be configured to receive input (for example, data information and power) from an external apparatus and transmit the received input to one or more elements in the electronic device 400 or may be configured to transmit data between the electronic device 400 and an external apparatus.

The memory 409 may be configured to store a software program and various data. The memory 409 may primarily include a program storage area and a data storage area, where the program storage area may store an operating system, an application (such as a sound playing function, an image playing function) required for at least one function, and the like; and the data storage area may store data (such as audio data, a phone book) created based on the use of a mobile phone. In addition, the memory 409 may include a high-speed random access memory or a nonvolatile memory, for example, at least one disk storage device, a flash memory, or other volatile solid-state storage devices.

The processor 410 is a control center of the electronic device and connects all parts of the electronic device using various interfaces and circuits. By running or executing software programs and/or modules stored in the memory 409 and by calling data stored in the memory 409, the processor 410 implements various functions of the electronic device and processes data, thus performing overall monitoring on the electronic device. The processor 410 can include one or more processing units. For example, the processor 410 can be integrated with an application processor and a modem processor. The application processor mainly processes the operating system, the user interface, applications, etc. The modem processor mainly processes wireless communication. It can be understood that, alternatively, the modem processor may not be integrated into the processor 410.

The electronic device 400 may further include the power supply 411 (for example, a battery) supplying power to various components. For example, the power supply 411 may be logically connected to the processor 410 through a power management system, so as to implement functions such as managing charging, discharging, and power consumption through the power management system.

In addition, the electronic device 400 includes some functional modules not shown. Details are not described herein.

Optionally, embodiments of the present disclosure further provide an electronic device, including a processor 410, a memory 409, and a computer program stored in the memory 409 and capable of running on the processor 410, wherein when the computer program is executed by the processor 410, processes of the above receiver control method embodiment are implemented, and same technical effects can be achieved. In order to avoid repetition, details are not elaborated herein again.

Embodiments of the present disclosure further provide a computer readable storage medium. The computer readable storage medium stores a computer program, and when the computer program is executed by a processor, the processes of the receiver control method embodiment are implemented, and same technical effects are achieved. To avoid repetition, details are not elaborated herein again. The computer readable storage medium may be a non-transient storage medium, for example: a read-only memory (ROM), a random access memory (RAM), a magnetic disk, or an optical disc.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. In the absence of more restrictions, an element defined by the statement "including a . . . " does not exclude another same element in a process, method, article, or apparatus that includes the element.

The foregoing describes the aspects of the present disclosure with reference to flowcharts and/or block diagrams of the method, the apparatus (system), and the computer program product according to the embodiments of the present disclosure. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. This processor may be, but is not limited to a general-purpose processor, a special-purpose processor, an application-specific processor, or a field programmable logic array. It should be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on the understanding, the technical solutions of the present disclosure essentially or the part that contributes to the prior art may be embodied in the form of software products. The computer software product is stored in a storage medium (such as ROM/RAM, a magnetic disk and an optical disk), including several instructions for enabling one terminal (which may be a mobile phone, a computer, a month, an air conditioner, or a network device) to implement the method in each embodiment the present disclosure.

The embodiments of the present disclosure are described with reference to the accompanying drawings above. However, the present disclosure is not limited to the foregoing specific implementations. The foregoing specific implementations are merely exemplary, but are not limiting. A person of ordinary skill in the art may make many forms without departing from the objective and the scope of the claims of the present disclosure.

The invention claimed is:

1. A receiver control method, performed by an electronic device, wherein the electronic device comprises at least one receiver, wherein the at least one receiver is electrically connected to a baseband circuit, and at least one feedback circuit is arranged between the at least one receiver and the baseband circuit, the receiver control method comprising:

determining whether the at least one receiver is blocked, wherein determining whether the at least one receiver is blocked comprises:

detecting a target parameter of the at least one receiver to obtain a detection value of the target parameter, wherein the target parameter comprises at least one of an impedance of the at least one receiver or a resonance frequency of the at least one receiver; and when the detection value of the target parameter of the at least one receiver meets a preset condition, determining that the at least one receiver is blocked, wherein:

when the target parameter is the impedance of the at least one receiver, the preset condition is: a detected maximum impedance value of the at least one receiver is less than a first predetermined threshold, wherein the first predetermined threshold is (R'+R")/2, or the first predetermined threshold is R', wherein R' is a maximum impedance value when the at least one receiver is not blocked, and R" is a maximum impedance value when the at least one receiver is blocked, when the target parameter is the resonance frequency of the at least one receiver, the preset condition is: a resonance frequency value corresponding to a detected maximum impedance value of the at least one receiver is less than a second predetermined threshold, wherein the second predetermined threshold is (F0'+F0")/2, or the second predetermined threshold is F0', wherein F0' is a resonance frequency value corresponding to a maximum impedance value R' when the at least one receiver is not blocked, and F0" is a resonance frequency value corresponding to a maximum impedance value R" when the at least one receiver is blocked, and when the target parameter comprises the impedance and the resonance frequency of the at least one receiver:

before determining whether the at least one receiver is blocked, the method further comprises: according to the impedance and the resonance frequency of the at least one receiver when the at least one receiver is not blocked, obtaining a first impedance curve f' of the at least one receiver, and determining a maximum impedance value R1' and a second maximum impedance value R2' on the first impedance curve f'; and after obtaining the detection value of the target parameter, the receiver control method further comprises:

based on the detection value of the target parameter, obtaining a second impedance curve f" of the at least one receiver, and determining a maximum impedance value R1" and a second maximum impedance value R2" on the second impedance curve f" and the preset condition is: on the first impedance curve f' and the second impedance curve f' a resonance peak of the R1" corresponds to a resonance peak of the R1', and a resonance peak of the R2" does not correspond to a resonance peak of the R2', and in response to the at least one receiver being blocked, adjusting an electrical signal gain of a feedback circuit from the at least one feedback circuit corresponding to the at least one receiver to reduce an electrical signal input to the at least one receiver.

2. The receiver control method according to claim 1, wherein after adjusting the electrical signal gain of the feedback circuit corresponding to the at least one receiver to reduce the electrical signal input to the at least one receiver, the method further comprises:

when the at least one receiver is not blocked, adjusting the electrical signal gain of the feedback circuit corresponding to the at least one receiver to increase the electrical signal input to the at least one receiver to a preset value.

3. A receiver control device, comprising an electronic device, wherein the electronic device comprises at least one receiver, wherein the at least one receiver is electrically connected to a baseband circuit, and at least one feedback circuit is arranged between the at least one receiver and the baseband circuit, comprising:

a detection assembly configured to determine whether the at least one receiver is blocked and send the result to an adjusting assembly, wherein to determine whether the at least one receiver is blocked, the detection assembly is configured to:

detect a target parameter of the at least one receiver to obtain a detection value of the target parameter, wherein the target parameter comprises at least one of an impedance of the at least one receiver or a resonance frequency of the at least one receiver; and when the detection value of the target parameter of the at least one receiver meets a preset condition, determine that the at least one receiver is blocked, wherein:

when the target parameter is the impedance of the at least one receiver, the preset condition is: a detected maximum impedance value of the at least one receiver is less than a first predetermined threshold, wherein the first predetermined threshold is (R'+R")/2, or the first predetermined threshold is R', wherein R' is a maximum impedance value when the at least one receiver is not blocked, and R" is a maximum impedance value when the at least one receiver is blocked, when the target parameter is the resonance frequency of the at least one receiver, the preset condition is: a resonance frequency value corresponding to a detected maximum impedance value of the at least one receiver is less than a second predetermined threshold, wherein the second predetermined threshold is (F0'+F0")/2, or the second predetermined threshold is F0', wherein F0' is a resonance frequency value corresponding to a maximum impedance value R' when the at least one receiver is not blocked, and F0" is a resonance frequency value corresponding to a maximum impedance value R" when the at least one receiver is blocked, and when the target parameter comprises the impedance and the resonance frequency of the at least one receiver;

before to determine whether the at least one receiver is blocked, the detection assembly is further configured to: according to the impedance and the resonance frequency of the at least one receiver when the at least one receiver is not blocked, obtain a first impedance curve f' of the at least one receiver, and determine a maximum impedance value R1' and a second maximum impedance value R2' on the first impedance curve f'; and after to obtain the detection value of the target parameter, the detection assembly is further configured to:

based on the detection value of the target parameter, obtain a second impedance curve f" of the at least one receiver, and determine a maximum impedance value R1" and a second maximum impedance value R2" on the second impedance curve f", and the preset condition is: on the first impedance curve f' and the second impedance curve f', a resonance peak of the R1" corresponds to a resonance peak of the R1', and a resonance peak of the R2" does not correspond to a resonance peak of the R2'; and the adjusting assembly configured to:

receive the result sent by the detection assembly, and adjust the electrical signal gain of a feedback circuit from the at least one feedback circuit corresponding to the at least one receiver, in response to the at least one receiver being blocked, to reduce an electrical signal input to the at least one receiver, wherein the detection assembly is electrically connected to the adjusting assembly, and the adjusting assembly is electrically connected to the feedback circuit.

4. The receiver control device according to claim 3, wherein the number of the at least one receiver is two or more than two, wherein each of the at least one receiver is electrically connected to the baseband circuit respectively, and a feedback circuit is arranged between each receiver and the baseband circuit respectively.

5. An electronic device, comprising:

at least one receiver, wherein the at least one receiver is electrically connected to a baseband circuit, and at least one feedback circuit is arranged between the at least one receiver and the baseband circuit; and a receiver control device, comprising:

a detection assembly configured to determine whether the at least one receiver is blocked and send the result to an adjusting assembly, wherein to determine whether the at least one receiver is blocked, the detection assembly is configured to:

detect a target parameter of the at least one receiver to obtain a detection value of the target parameter, wherein the target parameter comprises at least one of an impedance of the at least one receiver or a resonance frequency of the at least one receiver; and when the detection value of the target parameter of the at least one receiver meets a preset condition, determine that the at least one receiver is blocked, wherein:

when the target parameter is the impedance of the at least one receiver, the preset condition is: a detected maximum impedance value of the at least one receiver is less than a first predetermined threshold, wherein the first predetermined threshold is (R'+R")/2, or the first predetermined threshold is R', wherein R' is a maximum impedance value when the at least one receiver is not blocked, and R" is a maximum impedance value when the at least one receiver is blocked, when the target parameter is the resonance frequency of the at least one receiver, the preset condition is: a resonance frequency value corresponding to a detected maximum impedance value of the at least one receiver is less than a second predetermined threshold, wherein the second predetermined threshold is (F0'+F0")/2, or the second predetermined threshold is F0', wherein F0' is a resonance frequency value corresponding to a maximum impedance value R' when the at least one receiver is not blocked, and F0" is a resonance frequency value corresponding to a maximum impedance value R" when the at least one receiver is blocked, and when the target parameter comprises the impedance and the resonance frequency of the at least one receiver:

before to determine whether the at least one receiver is blocked, the detection assembly is further configured to: according to the impedance and the resonance frequency of the at least one receiver when the at least one receiver is not blocked, obtain a first impedance curve f' of the at least one receiver, and determine a maximum impedance value R1' and a second maximum impedance value R2' on the first impedance curve f'; and after to obtain the detection value of the target parameter, the detection assembly is further configured to:

based on the detection value of the target parameter, obtain a second impedance curve f' of the at least one receiver, and determine a maximum impedance value R1" and a second maximum impedance value R2" on the second impedance curve f" and the preset condition is: on the first impedance curve f' and the second impedance curve f' a resonance peak of the R1" corresponds to a resonance peak of the R1', and a resonance peak of the R2" does not correspond to a resonance peak of the R2'; and the adjusting assembly configured to:

receive the result sent by the detection assembly, and adjust the electrical signal gain of a feedback circuit from the at least one feedback circuit corresponding to the at least one receiver, in response to the at least one receiver being blocked, to reduce an electrical signal input to the at least one receiver, wherein the detection assembly is electrically connected to the adjusting assembly, and the adjusting assembly is electrically connected to the feedback circuit.

6. The electronic device according to claim 5, wherein the number of the at least one receiver is two or more than two, wherein each of the at least one receiver is electrically connected to the baseband circuit respectively, and a feedback circuit is arranged between each receiver and the baseband circuit respectively.

* * * * *